Feb. 6, 1951 R. F. HLAVATY 2,540,331
INSULATION
Filed June 18, 1945 7 Sheets-Sheet 3

Inventor
Rudolf F. Hlavaty
by Parker & Carter
Attorneys.

Feb. 6, 1951      R. F. HLAVATY      2,540,331

INSULATION

Filed June 18, 1945      7 Sheets-Sheet 6

Inventor
Rudolf F. Hlavaty
by Parker + Carter
Attorneys

Feb. 6, 1951  R. F. HLAVATY  2,540,331
INSULATION
Filed June 18, 1945  7 Sheets-Sheet 7

Inventor
Rudolf F. Hlavaty
by Parker + Carter
Attorneys.

Patented Feb. 6, 1951

2,540,331

UNITED STATES PATENT OFFICE 2,540,331

INSULATION

Rudolf F. Hlavaty, Cicero, Ill.

Application June 18, 1945, Serial No. 600,109

9 Claims. (Cl. 98—31)

This invention relates to insulation material having sound and thermal insulating qualities. It has for one object to provide an efficient material of that nature.

It has for another object to provide a combination of insulation with the structure of a hollow member.

Another object is to provide a combination of insulation with the structure of a hollow member and to arrange for cooling or heating of the insulation.

Another object is to provide a combination of insulation with an automotive vehicle and to provide for the heating of the insulation or parts of it by the propelling means of said vehicle.

Another object is to provide a combination of insulation with a vehicle and to provide for cooling of the insulation or portions of the insulation, either as a result of the movement of the vehicle or as a result of the action of other instrumentalities.

A further object is to provide in a mass of insulation ventilating means.

Another object is to provide a ventilated heating or cooling insulation whereby the heat insulating qualities of the insulation are increased as a result of said insulation.

Other objects will appear from time to time throughout the specification and claims.

This invention is illustrated more or less diagrammatically in the accompanying drawings, wherein.

Like parts are indicated by like characters throughout the specification and the drawings.

The various forms of airplanes illustrated are shown to suggest the association of the insulation with airplanes or other vehicles. Insulation might be mounted in similar manner in airplanes of any type of propulsion, including jet propulsion. It might also be mounted in vehicles such as busses, railroad cars, locomotives or automobiles. It might be mounted in stationary containers, such as refrigerators, cold rooms or heated rooms.

Figure 3:
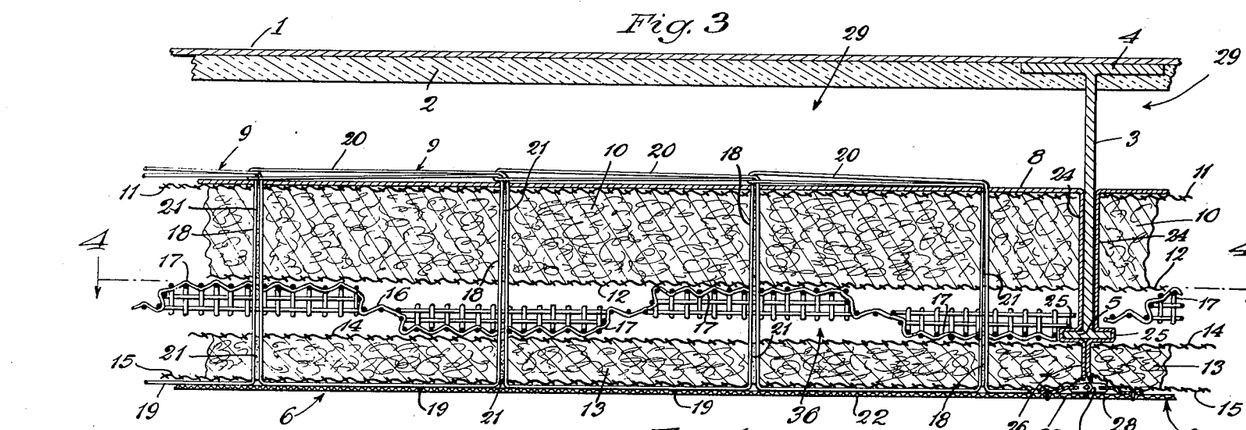
Figure 3 is a transverse section through the insulation of Figure 2, as arranged in the body of the airplane shown in Figure 1.
Figure 10:
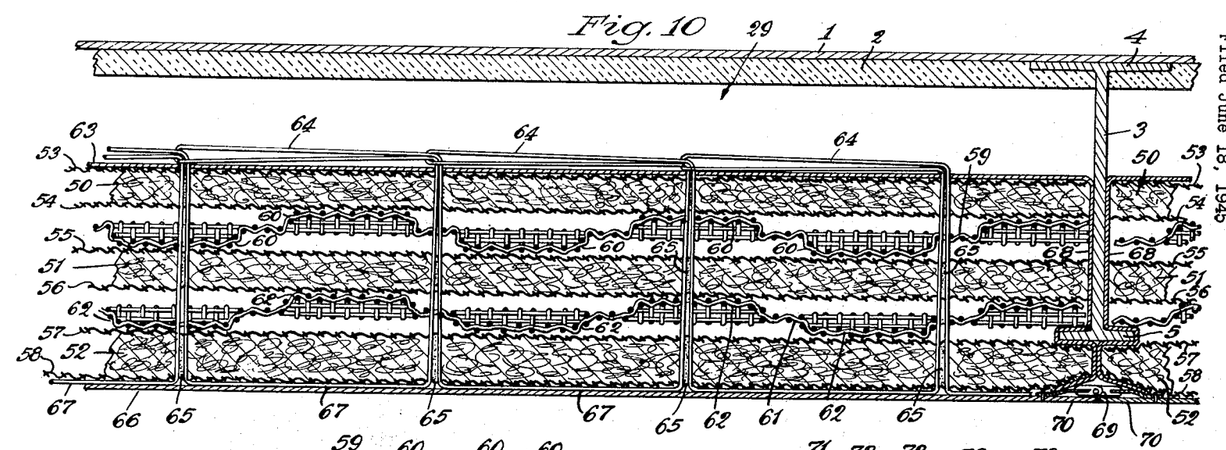
Figure 10 is a view of a modified form of insulation generally similar to that shown in Figure 3, but with additional layers of insulation.

As shown, the airplane body comprises a skin 1 upon which a quantity of insulating material 2 may be sprayed, cemented or otherwise placed. The airplane will ordinarily include structural stiffening members, such as frame members 3. These members may include web portions, as shown particularly in Figures 3 and 10, and flanges 4 which are secured to the skin 1. They may also include flanges 5, which, as shown in Figures 3 and 10, engage and are surrounded by the insulation. The insulation may be secured to the structure of the airplane or other vehicle or hollow member in any manner desired.

Figure 1:
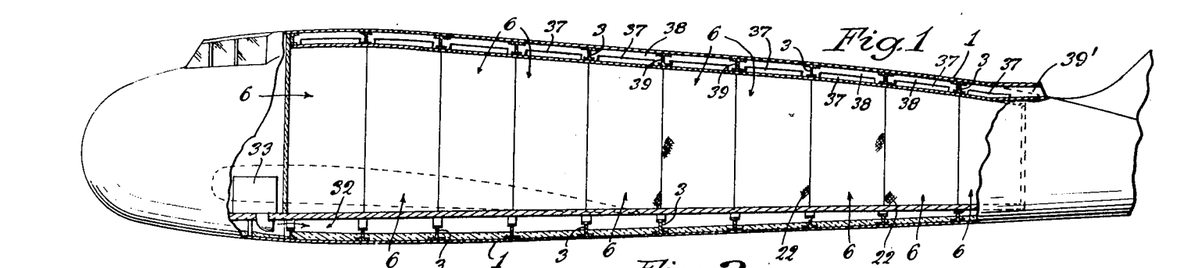
Figure 1 is a longitudinal section through the body of an airplane illustrating the location and arrangement of the insulation of this invention.
Figure 2:
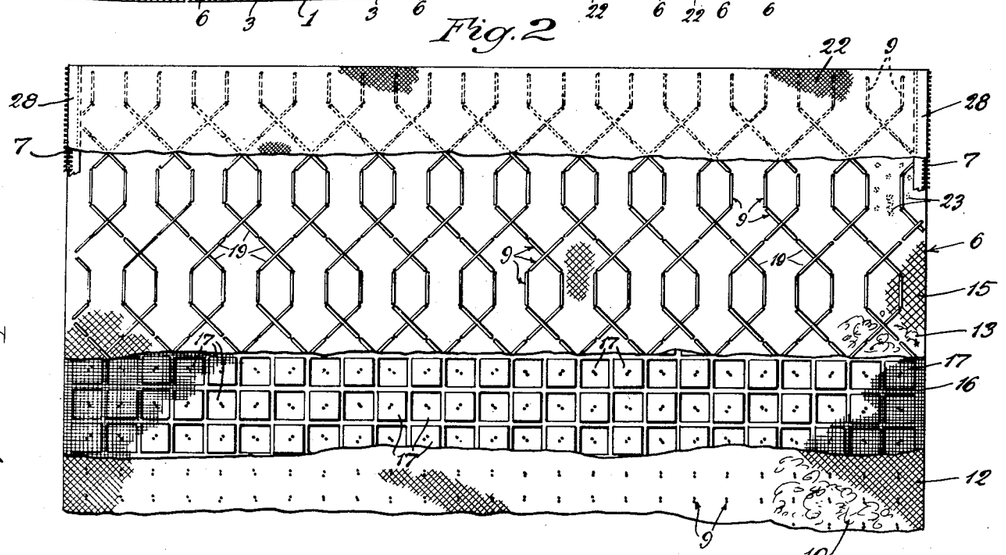
Figure 2 is a plan view with parts broken away, illustrating one form of insulation arranged in a separable panel on an enlarged scale.

One convenient manner is to form the insulation in panels 6. A portion of one such panel is shown in Figure 2, and a number of the panels are shown in Figure 1. The panels may be provided along their sides, as at 7, with slide fasteners so that they may be conveniently joined together. Whatever the details of the insulatiton, it is convenient to form it of a plurality of layers of material.

In the form shown in Figures 2 and 3 in detail, the insulation includes a layer of covering material 8 through which stitches 9 of any desired material are passed to hold the various layers together. An outer layer of insulation 10 may have covering layers of cloth 11 and 12, such as cheesecloth or other preferably porous material.

Figures 4, 5:
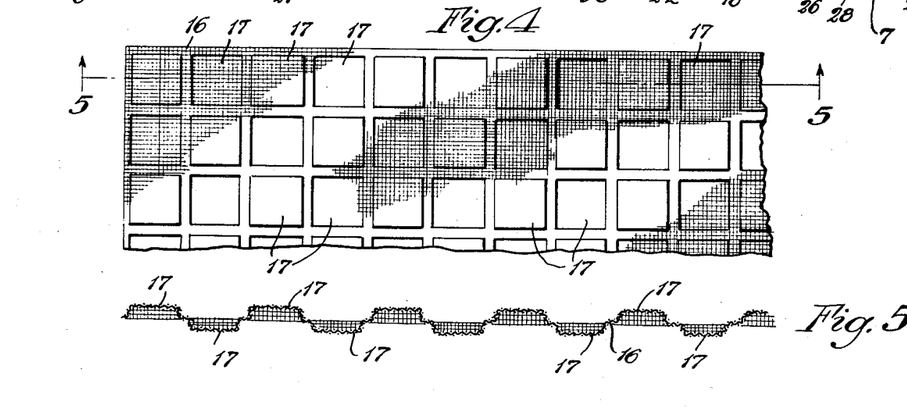
Figure 4 is a plan view taken along line 4—4 of Figure 3.
Figure 5 is a transverse section taken at line 5—5 of Figure 4.

An inner layer of insulation 13 is also provided with layers of cloth 14 and 15. When the word "cloth" is used herein, it applies to fabric formed of any material—natural, mineral, vegetable, synthetic or metallic. As shown particularly in Figure 3, the outer and inner layers of insulation 10 and 13 are separated by a layer of spacing material 16. This material may be of metal or any other suitable material which is sufficiently stiff and at the same time sufficiently porous to serve the purpose required. It must be freely air-pervious and must be of sufficient strength to hold the layers of insulation separated from each other, and thus to preserve a free space for the passage of air or gas. As shown, the material 16 is provided with displaced portions or areas 17, 17. These displaced spaces may be in the form of rectangles, as shown in Figures 2 and 4 or may have any other desired shape, outline or contour.

It will be noticed that the stitches 9 pass through the entire body of insulation, as at 18, and that a single thread lies along the surface, as at 19, while a double or looped thread lies along the opposite surface, as at 20. The stitches are so arranged that only a single stitch passes through a single perforation, and hence the perforations may be of minimum size, and the quality of the insulation is thus only slightly impared by the formation of the perforations for the passage of the stitches. It will be seen in Figure 2, in particular, that the stitches on the surfaces of the material form a pattern which in this case follows a rectangular outline. It will be further seen that where the stitches intersect there is no perforation.

Preferably the insulation is to some degree cemented. The stitches themselves may be cemented as sewn and will adhere to the surfaces with which they remain in contact. Some cement will be drawn into the perforations, and it is indicated, as at 21, in Figure 3. Because of the small size of the perforations due to the type of stitching used, the quantity of cement retained in any give perforation is held to a minimum, and hence the insulation is solidified to a minimum degree. Were several stitches pulled through a single perforation, that perforation would of necessity become enlarged. This in itself would reduce the insulating qualities. If cement were present, as it is in the present case, a larger cement body or "plug" would fill each perforation and this would further increase the degree of solidification, and hence further reduce the quality of the insulation.

The body of insulation may have an interior finishing cloth 22. As shown in Figure 3, this material is cemented to the surface of the insulation which is exposed to the interior of the vehicle or container, and this provides a smooth finish. The cement is indicated in Figure 2, as at 23.

Where the insulation is arranged in panels, as shown in Figures 1, 2 and 3, the covering material or finishing cloth 8 is carried about each edge of the mass of insulation, as at 24, in Figure 3. This edge cloth or edge portion of the covering material or finishing cloth 8 may contact the web of the structural member 3, and it is shaped, as at 25, to fit about the web 5 and to extend beyond it, as at 26, to engage the slide fastener 7. The finishing cloth 22 is provided with flaps 28 which may overlie and cover the slide fastener, as shown in Figure 3.

By means of the panel arrangement, the portions of insulation may be readily put in place and equally readily removed. It will be noticed also that the insulation is spaced away from the outer skin 1 and from the insulating coating 2 of that outer skin. A dead air space 29 is thus provided.

Figure 6:
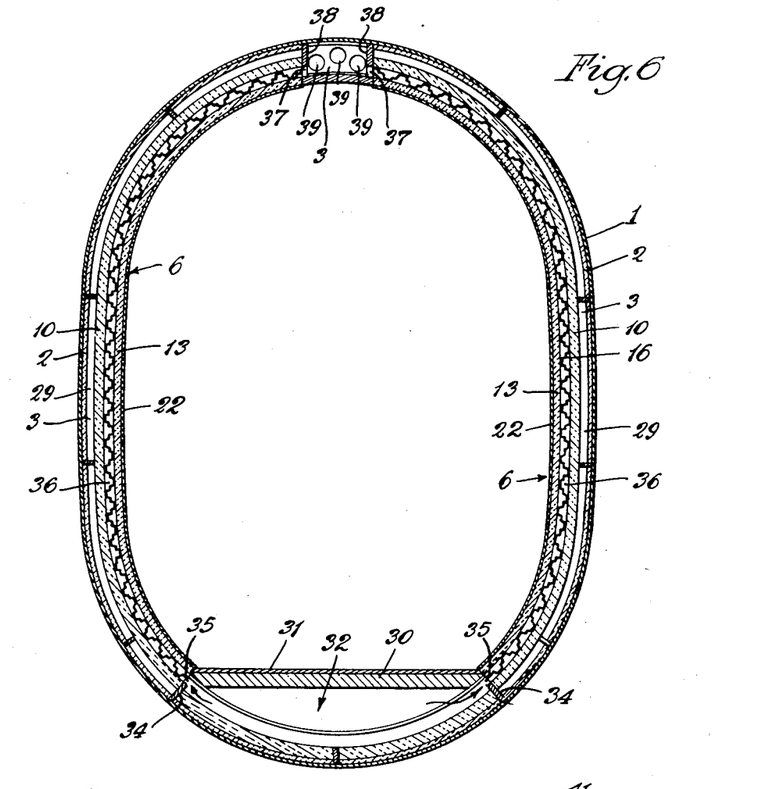
Figure 6 is a transverse section through the airplane of Figure 1 with the insulation in place.

Figure 6 illustrates the arrangement of the insulation in a vehicle such as an airplane body, and indicates the relationship of the insulation to the structural members of the airplane. As shown in that figure, the airplane is provided with a floor 30 which may be provided with an insulating carpet or floor covering 31. Beneath the floor 30 is an air space 32 which, as shown in Figure 1, is connected to or in communication with a heater 33. This heater, if the airplane is propelled by an engine which produces heat, will be heated from that engine in any desired manner and will discharge its heat into the longitudinal passage 32. This passage is in communication with the several spaces 29 which are defined between the ribs or structural members 3. As shown, adjacent the floor 30 there are provided members 34 perforated, as at 35. These perforations are in communication with the space in the insulation in which the spacing material 16, 17 is placed, and thus the space 36 between the layers of insulation is in communication with the longitudinal air or gas passage 32. Whatever gases are discharged into the passage 32 move in the direction of the arrows upwardly through the space 36 toward the top of the airplane and pass outwardly through perforations 37 in members 38 disposed preferably near the top of the airplane.

An exit opening 39' shown in Figure 1 is provided from the space defined between the members 38, 38. Perforations 39 may be formed in the members 3 to permit the passage of air or gas along the top of the airplane, vehicle or other container.

The particular form of insulation which is to be used in connection with an airplane or other container may vary widely and that shown in the first six figures is shown merely as being illustrative of one form of insulation arranged in one suitable manner in an airplane and providing a passage for air or gas from any suitable source in the airplane to the spaces defined within the mass of insulation and from those spaces to any suitable point of discharge.

Figure 7:
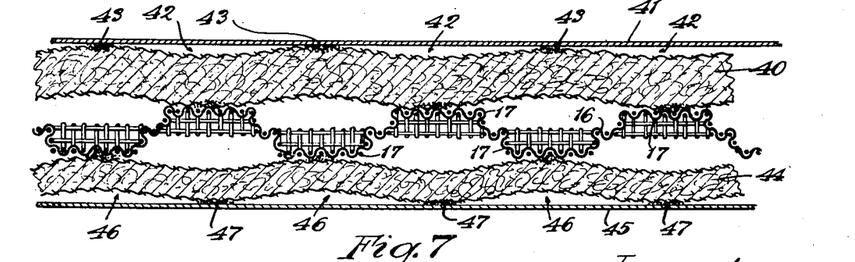
Figure 7 is a view generally similar to Figure 3, but illustrating a modified form of insulation and omitting the wall of the airplane body.

A modified form of insulation is illustrated in Figure 7. As shown, there is one layer of insulation 40 which is arranged in curves or scallops. It is partially spaced away from a covering member 41 to provide air spaces 42. The layer 40 is cemented to the material 41, as at 43. A second layer of insulation 44 is similarly shaped and is spaced away from a layer of finishing material 45 to provide air pockets 46. It is cemented to the material 45, as at 47, in separated areas. It will be noticed that the portions 43 are out of alignment with the portions 47, so that a line drawn through the insulation will not pass through both a cemented area 43 and an area 47.

Figure 8:
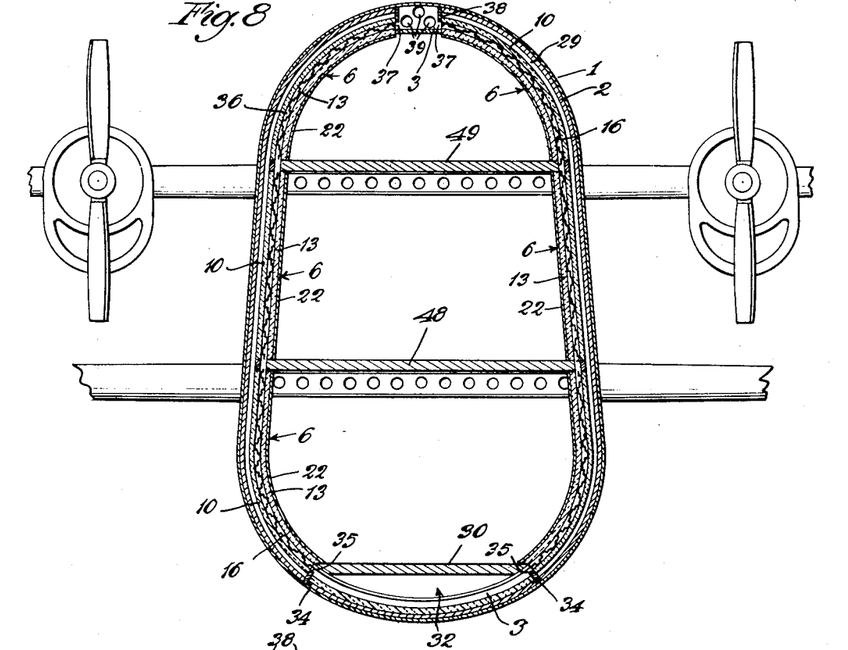
Figure 8 is a transverse section generally similar to Figure 6, illustrating the insulation installed in a different construction of airplane body.

As shown in Figure 8, an airplane is illustrated which may have three floors or levels. This airplane body includes the same general structural features as those shown in Figures 1 and 6, the difference being only in the shape of the body and the provision of more than one level. Hence the same reference numerals are applied to similar parts. Thus in addition to the floor 30, there is provided a second floor 48 and a third floor 49.

Figure 9:
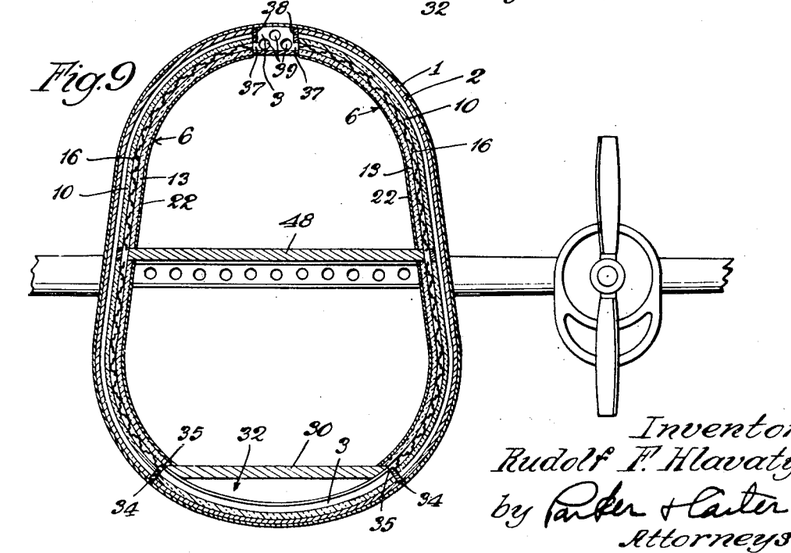
Figure 9 is a transverse section illustrating the installation of the insulation in still a different form of airplane body.

Similarly, in Figure 9 a two-storied airplane is provided. The other structural parts of the airplane are not referred to, since they form no part of the invention.

Figure 10 illustrates a modified or three-thickness arrangement of insulation. This form of insulation includes an outer layer 50, an intermediate layer 51 and an inner layer 52. These layers may be provided each with a material 53, 54, 55, 56, 57 and 58. Between the layers 50 and 51 is a spacing element 59 provided with displaced portions 60, 60 to hold the layers apart, and between the layers 51 and 52 is a spacing element 61 having displaced portions 62, 62 to hold those layers apart. An outer finishing layer of cloth 63 may be secured to the outer layer of the insulation and may, as shown in Figure 10, lie inside of the stitches 64. The stitches pass through perforations and are formed in the manner shown in Figure 2 and may be cemented, as at 65. Finishing cloth 66 may cover the inner layer of the material and may be cemented in place over the stitch portions 67.

The panels of insulation are closed by members 68 and are secured in place by slide fasteners 69 which are covered by flaps 70, 70.

Figures 11, 12:
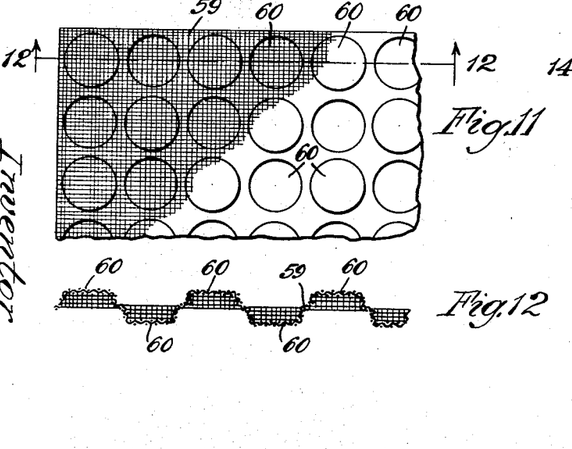
Figure 11 is a plan view of the insulation spacing material which appears in Figure 10.
Figure 12 is a transverse section taken at line 12—12 of Figure 11.
Figures 13, 14:
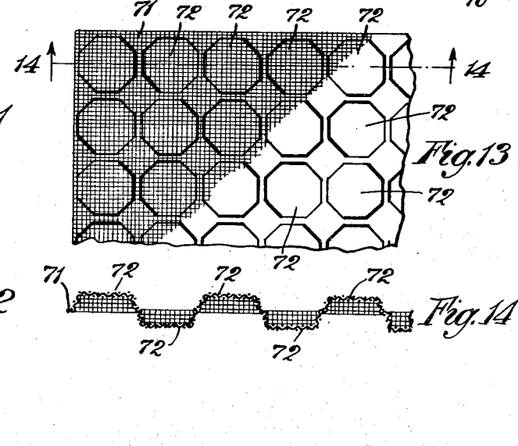
Figure 13 is a view generally similar to Figure 11, but showing a modified form of insulation spacing means.
Figure 14 is a transverse section taken at line 14—14 of Figure 13.

The spacing material of Figure 10 is shown in plan in Figure 11 and in section in Figure 12. The difference between the spacing materials 59 and the materials 61 may merely be that they are formed of a different material or a coarser material or of a material having coarser or finer mesh. The form of spacing material illustrated in Figures 4 and 5 might also be used. A further modified pattern is shown in Figures 13 and 14. As there shown, a spacing material 71 is provided with displaced portions 72, 72. As shown in Figures 2, 4 and 5 the displaced portions or depressions are in effect rectangular, cup-like members, adjacent members being displaced in opposite directions. As shown in Figures 11 and 12, the displaced portions are rounded, cup-like depressions, and as shown in Figures 13 and 14 the displaced portions are rectangular depressions. The invention is not limited to any particular form of depression.

Figure 15:
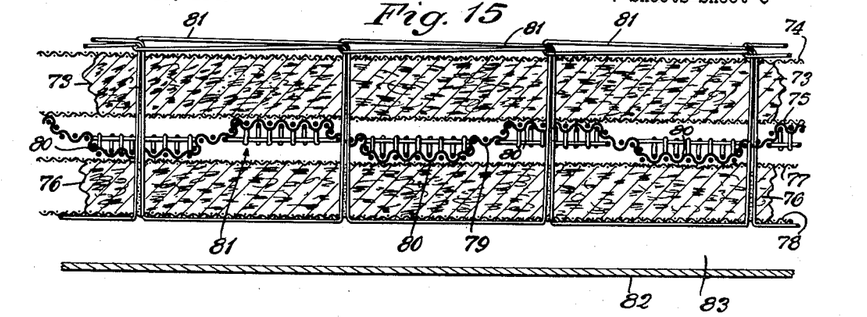
Figure 15 is a sectional view through a further modified form of insulation installed in a container.
Figure 16:
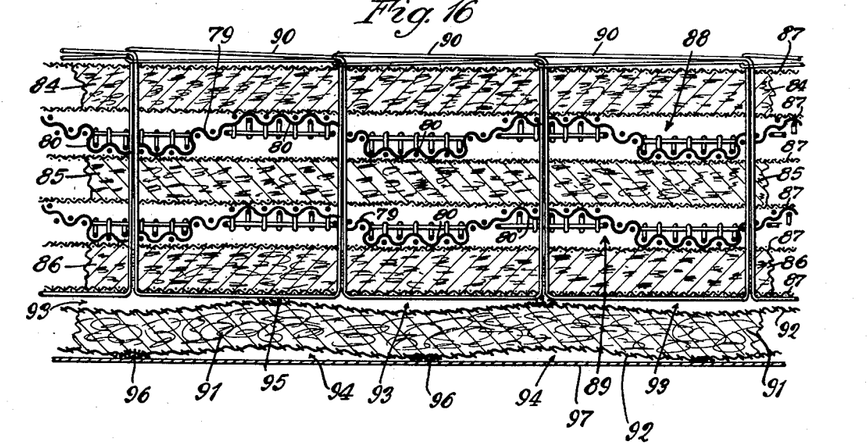
Figure 16 is a view similar to Figure 15, showing a further modified form of insulation.
Figure 17:
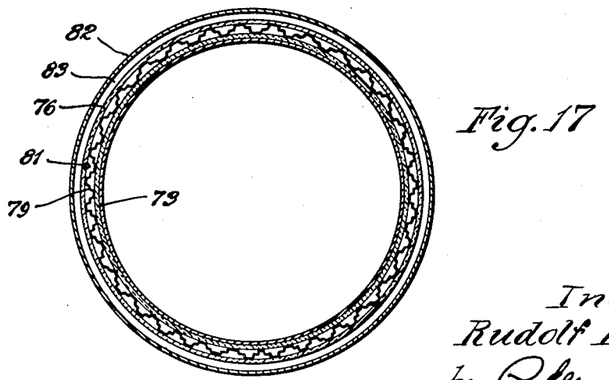
Figure 17 is a transverse section through a round container having an exterior wall and provided with insulation.

As shown in Figures 15, 16 and 17, the invention is adapted particularly to a construction or to an arrangement in which it is desired to cool the insulation. Sometimes where insulation is subjected to extreme heat it is an advantage to pass cool air or gas through the body of the insulation. Cool air or gas might be passed through the insulation of the earlier figures. The insulation illustrated in Figures 15, 16 and 17 also preferably includes an additional quantity or proportion of metal. As shown in Figure 15, a layer of insulation 73 is provided with layers of wire cloth 74 and 75. The insulation shown in these figures is preferably designed for controlling extreme degrees of heat and the material of which the layer 73 is made is therefore chosen particularly for that purpose. It may be formed of mineral wool, mica, pearlite or any other material having particularly high heat resistant qualities. It is recognized that some insulation must be used in the presence of tremendous heat and that some materials having normally good insulation qualities would burn, char or be destroyed in the presence of extreme heat.

A second layer 76 is preferably formed of similar material and is provided with layers of wire cloth 77 and 78. A spacer 79 having displaced portions 80, 80 is positioned between the layers 73 and 76. The entire mass of material is held together by stitches 81 which may be formed of wire and are sewn generally in the pattern of Figure 2 and as described above. The spacing member 79, 80 since it holds the layers apart, establishes and maintains an open area 81 between the two layers and between this cool air or gas may pass. The insulation may be positioned within a container whose wall 82 is shown and is preferably spaced away from that wall to provide a dead air space 83.

The form of insulation shown in Figure 16 is generally similar to that shown in Figure 15, except that three layers are provided. There is thus a layer 84, a layer 85 and a layer 86. Each of the layers has positioned on its outer face a layer of wire cloth 87 and a spacer 79 having displaced portions 80 is positioned between each of the pair of layers 84, 85 and 85, 86. Thus two open spaces or passages 88 and 89 are defined, respectively, between the layers 84, 85 and the layers 85, 86. The entire mass may be sewn together by stitches 90 which are preferably formed according to the pattern of Figure 2 and as described above. In addition to the three-layer insulation just described, a layer of insulation 91 is formed. This may be of other material. In fact, it may be of any suitable insulating material and is preferably provided with layers of enclosing material 92, 92. It is shaped to provide air spaces 93 and 94 and is cemented on one side, as at 95, to the three-layer mass of insulation and on the opposite side, as at 96, to the wall 97 of a container.

The material shown in Figures 15 and 16 may be used in any of the associations previously illustrated and described. It, as well as any of the other forms of insulation, may be positioned in a container such as that shown in section in Figure 17. The insulation shown in Figure 17 is simplified because of the small scale of that figure. Obviously the three-layer or a two-layer insulation might be shown and used in that association.

In the several forms or arrangements of the insulation it is preferable to provide one face of the mass of insulation with a reflective coating. Thus in the form of Figure 3 the material 8 is provided with a coating which is preferably sound and thermal reflective. This may be a metallized coating or a metallized material and it may be of any other suitable construction or nature which resists the passage of sound and heat or cold. If the invention is installed in an airplane, as shown in Figure 3, in general the main problem is to prevent the cooling of the interior of the cabin and also to keep the cabin as quiet as possible. Hence the insulation is spaced away from the skin and the space 29 is provided. This space may accommodate wiring, control devices and utilities of any sort. In general the composite insulation of this invention is arranged to provide one or more passages through which hot or cold air or other gas may be caused to move.

If the insulation is installed in a refrigerator or a cold room, it may be desirable to direct cold gas through the spaces. In general also, the layers of insulating material such as the layers 10 and 13 of Figure 3 and the corresponding layers of the other figures are formed of sound and thermal insulating material. The exact nature of the material depends upon the particular problem and almost any insulating material may be used. This may consist of one material or a mixture of materials and natural, synthetic, vegetable, mineral or animal fibers or other materials may be used. Generally the outer face of the mass of material is provided with an impervious heat, cold and sound reflective surface, while the inner face of the mass is generally provided merely with a porous trimming fabric which is of satisfactory appearance for an interior trim.

The insulating material which may be secured to the inside of the airplane skin or to the side of whatever other enclosure is used may be of any desired material. Certain sorts of fibers may be sprayed or painted or glued onto the side of the skin, or a fabric may be cemented thereto.

When the insulation is applied to a structure such as that shown in Figures 8 and 9, the panels of the insulation are preferably broken up so that for the space of each level one set of panels is used. Except for this difference, the construction is substantially the same as that illustrated and described in connection with Figure 6.

Where two or more air spaces are provided in the mass of insulation, as shown for example in Figure 10, the insulation itself may be of any desired material and hot or cold air may be circulated through both air spaces and, if desired, unheated air may be circulated through one air space, while heated or cooled air is circulated through the other air space. The presence of the air spaces permits any desired combination of temperatures in the circulating medium.

One purpose of passing air or gas through the insulation is to keep it dry. Since the insulation is air-pervious some moisture will inevitably pass into the insulation with the air which enters, and there is always a chance that this moisture will be condensed and remain in the insulation. The air passages permit the moisture to pass out again, and the use of moving streams of hot or cold air or gas accelerates and makes more certain the removal of the moisture. Also, the use of heated air serves, when necessary, to heat the interior of the vehicle or building or enclosure with which the insulation is associated. The use of cold air increases the anti-heating effect of the insulation and is also useful in connection with ventilation.

Where extreme heat conditions must be dealt with, such for example as in jet propelled or rocket airplanes or in connection with burners or boilers, the insulation will be formed of material capable of resisting great heat and will generally have cold air circulated through it. The forms of Figures 15, 16 and 17 are for the purpose of dealing with extreme heat conditions. Where that is the case, the material which encloses the several layers of insulation will preferably be of metallic wire. Thus in Figure 15 the layers of material 74 and 75 would ordinarily be of metal wire and the insulating material which forms the layers 73 and 76 would be of mica batt, mineral wool, mica, earth, clay, carbon or volcanic earth or a mixture of them or any other highly heat resistant insulating material. The fabric 77 and 78 will preferably also be made of metal cloth or metal alloy, and the stitching 81 will be of wire or other highly heat resistant material of any sort. What has been said of the form of Figure 15 applies equally to Figure 16.

As shown in Figure 17, the means for discharging air into the space in the insulation has been omitted, but it is to be understood that means for discharging and removing air is to be used in this connection.

Figure 18:
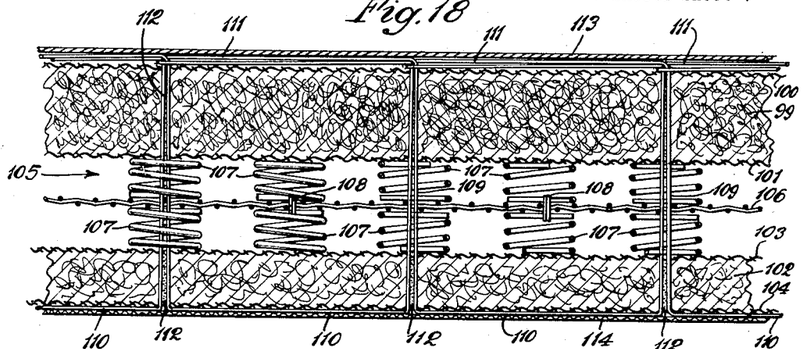
Figure 18 is a section through the insulation, showing a further modification of the insulation and separator.
Figure 19:
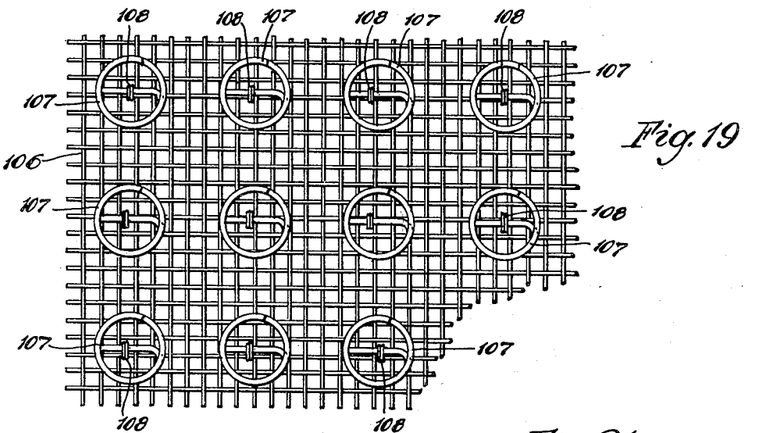
Figure 19 is a plan view of the separator of Figure 18.

In the modified form of Figure 18 an outer layer 99 may be formed of any desired insulation material and is preferably relatively dense. It is provided with outer and inner closure materials 100 and 101, respectively. These may be cheesecloth or similar porous material.

A second or inner layer of insulation 102 is preferably thinner and less dense than the layer 99 and is enclosed in sheets of material 103 and 104 which are freely porous. A space 105 is defined between the layers 99 and 102. A spacer 106 having springs 107 defines and maintains the space 105. These springs may be made in any desired manner. A continuous spring may pass through the spacing sheet 106, or separate springs may be positioned in cooperation with each other, one on each side of the spacing member 106. They may be held in place by ties 108 or they may be held in place by stitches 109. The stitches include portions 110 on one side of the composite mass and portions 111 on the opposite side of the composite mass. Stitch portions 111 are looped about the portions 109 where they extend to the outer surface of the mass of insulation.

Cement is preferably applied to the threads and cements them together where they are in contact with each other and cements them to the surfaces with which they are in contact. In the perforations in the material through which the stitch portions 109 pass, the cement may collect, as at 112, to fill these perforations. A septum or reflective sheet 113 is positioned on what may be considered the outside of the mass of insulation, and although it may be conveniently secured by any means, it is preferably cemented in place over the thread portions 111.

A porous finishing sheet 114 is positioned on what may be considered the inner face of the mass, and this sheet may be conveniently cemented in place. A sheet 106 and the springs 107 may be made of any desired material. Metal or synthetic material is convenient.

Figure 20:
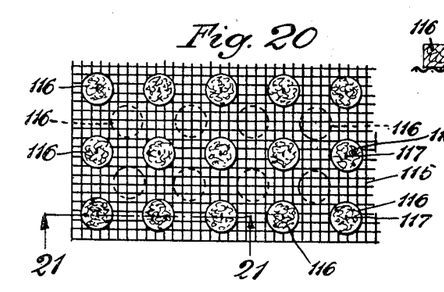
Figure 20 is a plan view of a modified separator.
Figure 21:
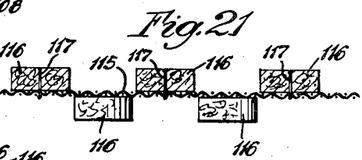
Figure 21 is a section taken at line 21—21 of Figure 20.

In the modified form of Figure 20, a sheet 115 has secured to it members 116 which may be of felt or other material. These are held in place on the sheet 116 by stitches, tufts or threads 117. These members may be spaced out of line with each other, as shown particularly in Figure 21, or they may be spaced wholly or partly in line with each other. The members 116 and the sheet 115 may be of any desired material.

Air conditioning has been mentioned above. Since the inner layer or more than one of the inner layers of the insulation mass may be air pervious, it is obvious that air forced into the space between the layers of insulation will to some degree pass through them into the interior of the vehicle or enclosure about which the insulation is positioned, and thus air will be discharged into the interior of the enclosure. This has the effect of air conditioning the enclosure. In the case of aircraft oxygen mixed with air or pure oxygen may, if desired, be discharged into this space and from it may be discharged into the interior of the enclosure. The amount of air or gas which will be discharged into the interior of the enclosure or vehicle or airplane depends upon the pressure at which the air or gas is supplied. If it is supplied at relatively low pressure, it will tend merely to pass through the space between the layers of insulation and be discharged through the outlet passage. If it is supplied at relatively high pressure more of it will tend to pass through the insulation and move into the interior of the vehicle or enclosure. When pressure is sufficient within the enclosure, obviously the air and gas therein will be carried away through the insulation into the space between the insulation and finally from the discharge passage.

It is pointed out that one side of the insulation—namely the side which is closest to the skin of the container or airplane or other vehicle—is substantially air impervious. Hence air and gas present on that side of the insulation will not pass through the insulation and air or gas which is present, and particularly which is present under pressure in the space between the layers of insulation, will not pass outwardly through this impervious layer. Therefore the passage of cold air through the space between the layers of insulation will serve either as a cooling means where extreme heat conditions are met with, or will serve as a warming means where extreme cold conditions are met with.

In connection with rocket and jet propelled airplanes, it is recognized that the propelling means of such airplanes produce extreme heat conditions and the qualities of ordinary mechanical insulation may not be adequate. Where that is the case, the passage of cold air or other gases through the space between the layers of insulation serves the vital purpose of carrying off much of the heat which may be transmitted to one side of the mass of insulation, and thus tends to cool the insulation itself and to reduce, if not actually to prohibit, the passage of heat from the outer layer of insulation to an inner layer.

All of this permits an improved insulating effect or permits a thinner and lighter mass of insulation to accomplish the same insulating effect as that which would be accomplished without the moving stream of air by means of a substantially heavier and thicker layer of insulation.

While I have stated that one layer on one side of the mass of insulation is substantially impervious to the passage of air and another layer or another side is substantially pervious to the passage of air, it is true that some of the advantages herein described would also be present should both or all of the layers of insulation be impervious to air or should both or all of the layers of insulation be pervious to air. The preferred condition is that in which one layer at least is substantially impervious to air and another layer at least is substantially pervious to air. In that case, which is the one illustrated in the drawings, air cannot pass through the outermost layer of insulation, but can pass through the innermost layer.

The stitching or form of stitching shown in Figure 2 holds the insulation together but does not compress it. The stitches are held at the time they are made so that they are properly formed and interlocked; at the same time, however, the material through which they are sewn is not compressed as is generally the case with most types of stitching. Thus a layer or a mass of insulation which is sewn according to the stitching disclosed herewith is substantially of the same thickness at the points where stitches pass through the material as it is at all other points.

The stitch is thus a loose stitch more like "tufting" and permits a suitable holding together of the material without any substantial compacting of the material and without any effective diminution of the insulating quality.

The layers of insulation shown generally in the drawings may be in the form of batts. This is true no matter what the material of which the layers are formed. Mica has been referred to as a suitable material. I have also referred to carbon, volcanic material, clay and earth. These materials may be mechanically treated or treated by heat and are generally made lighter, looser or more fluffy when treated by heat. They may then be arranged in layers or batts and they may be joined together in these layers or batts either by cementing or other joining or by mixture with different classes of material or by stitching.

When they are stitched, the individual layers may be arranged as shown between coatings of cheesecloth, tobacco cloth or the like. In general, the layers may be considered as comprising batts and they may and preferably will be stitched together according to the stitch shown in Figure 2, although they might be otherwise stitched together. When stitched together the stitches will preferably be cemented together so that they adhere to each other when in contact with each other and so that they adhere to the material through which they pass or with which they come in contact. This cement may be any form of adhesive and may comprise also a preservative to prevent rotting and other weakening or damaging of the threads. If the threads are formed of metal or metal alloys, they may be coated with cement or lacquer which has adhesive qualities as it dries, and the lacquer in that case serves the same purpose as the cement in the case of non-metallic threads or cords. The lacquer may also serve an anti-corrosive or anti-rusting effect, provided the metal is not subject to corrosion or rusting.

The separation of the layers can be accomplished in any manner and several different forms of separators are shown. The separators may be metallic, such as metal cloth. They might be separate spring elements or other metal elements. They might be separated by felt and the felt members might be separate or part of a continuous structure of varying thickness. The felt members, if used, might be cemented to the layers of insulation. This invention in its various forms may be used not only on the types of containers and vehicles mentioned, but on ships and watercraft of all sorts. It may be used to insulate the entire hull of a ship or a portion of the hull or a portion of the cabin.

In general, the invention comprises a mass of insulation having a plurality of layers, one of which is preferably impervious to the air, another of which is preferably air pervious, the layers being separated by any desired form of spacer so arranged that when the insulation is in position and in use, an air space is provided between adjacent layers through which hot or cold air or gas may be caused to move under greater or less pressure. The invention in the particular form here shown additionally includes the adaptation of the insulation to an airplane, and the arrangement of the insulation in the structure of the airplane in combination with means for discharging a stream of gas or air into the space between adjacent layers of insulation and for withdrawing it from that space. The insulation is in no sense limited to use in connection with an airplane. It may be used wherever insulation is desired, either as combined sound and thermal insulation or as thermal insulation alone.

Although I have shown an operative form of my invention, it will be recognized that many changes in the form, shape and arrangement of parts can be made without departing from the spirit of the invention, and my showing is therefore to be taken as, in a sense, diagrammatic.

I claim:

1. In combination with a container having a skin and spaced structural rib members supporting said skin, an insulating wall within the container comprising insulation units disposed between adjacent structural rib members, means supporting said units upon said structural rib members in spaced relation to said skin, said insulation units being formed of a plurality of layers of insulating material, a spacing member positioned between adjacent layers of said insulating material and defining an air space between said layers, said spacing member including a sheet of stiff, air pervious material provided with protuberances extending from at least one face of the sheet, said protuberances presenting spaced areas of substantial extent engaging the adjacent layers of insulating material and defining spaced voids of substantial volume between the protuberances, said voids being in communication with each other to provide a space through which air can pass in a path substantially parallel to the plane of the unit, tie means passing transversely through said layers of insulating material and said intervening spacing member and securing the same in assembled, superposed relation, and complemental separable fastener means carried by insulation units lying on opposite sides of said rib members for separably uniting the same along lines generally parallel to said structural rib members.

2. The combination recited in claim 1 wherein the exposed inner faces of said insulating units are covered with air pervious material carrying free flap portions at the edges of the units disposed adjacent said structural rib members, the flap portions of adjacent units being disposed in substantially abutting relation and cooperating to cover and conceal said separable fasteners.

3. The combination recited in claim 1 wherein said structural rib members extend from said skin inwardly of said container and are provided with oppositely directed lateral flange portions in spaced relation to said skin and wherein the insulating units lying on opposite sides of a structural rib member include edge portions enveloping said flanges and extending inwardly beyond and across the inner ends of the structural rib members, whereby the insulating units lying on opposite sides of a structural member cooperate to substantially completely enclose the inner ends of said structural member.

4. The combination recited in claim 1 wherein said structural rib members extend from said skin inwardly of said container and are provided with oppositely directed lateral flange portions in spaced relation to said skin and wherein the insulating units lying on opposite sides of a structural rib member include edge portions enveloping said flanges and extending inwardly beyond and across the inner ends of the structural rib members, and wherein said complemental separable fasteners are carried by the edge portions of said insulating units which extend across the inner ends of the rib members, whereby the insulating units lying on opposite sides of a structural member cooperate to substantially completely enclose the inner ends of said structural member.

5. The combination recited in claim 1 wherein duct means are provided within the container and disposed substantially transversely of the rib members and including means affording communication between said duct means and the spaces between said structural rib members, said insulating units being disposed with the air spaces therein in communication with said last-mentioned means, means for circulating a gaseous heat transfer medium through said ducts, and through the air spaces between the layers of insulating material within said units, and means for discharging said gaseous medium from said air spaces.

6. The combination recited in claim 1 wherein duct means are provided within the container in the lower part thereof and disposed substantially transversely of the rib members and including means affording communication between said duct means and the spaces between said structural rib members, said insulation units being disposed with the air spaces therein in communication with said last-mentioned means, and means for circulating a gaseous heat transfer medium through said duct means, and upwardly through the air spaces between the layers of insulating material within said units, and means for discharging said gaseous medium from said air spaces at the upper portion thereof.

7. The combination recited in claim 1 wherein duct means are provided within the container in the lower part thereof and disposed substantially transversely of the rib members and including means affording communication between said duct means and the spaces between said structural rib members, said insulation units being disposed with the air spaces therein in communication with said last-mentioned means, and means for circulating a gaseous heat transfer medium through said ducts, and upwardly through the air spaces between the layers of insulating material within said units, and means for discharging said gaseous medium from said container at the upper portion thereof, said discharge means including a duct extending transversely of the rib members at the top of the container and having communication with the air spaces within the several insulating units.

8. In combination with an enclosure including means defining a skin and spaced structural rib members supporting said skin, a plurality of insulation units mounted between and supported from said structural rib members in spaced, substantially parallel relation to said skin, said insulation units including spaced layers of insulating material and a substantially co-extensive air pervious spacing member positioned between adjacent layers of the insulating material and provided with spaced protuberances engaging said layers and maintaining the same in spaced relation, thereby defining an air passage through said units generally parallel to said skin, air impervious means covering the surface of said units opposed to said skin, air pervious means covering the surfaces of said units facing the interior of the enclosure, means for removably securing the units upon said structural members and means for flowing air through said air passages within said units and out through the air pervious covering means on the inner surfaces of said units into the enclosure.

9. An insulation unit comprising a plurality of layers of insulating material maintained in spaced relation by an intervening spacer member, said spacer member including a sheet of substantially stiff air pervious material substantially coextensive with said layers and provided with protuberances on its opposite faces, said protuberances presenting spaced areas of substantial extent engaging the adjacent layers of insulating material and defining spaced voids of substantial volume between the protuberances, said voids being in communication with each other to provide a space through which air can pass in a path substantially parallel to the plane of the unit, means sealing said air space at two opposite edges of the unit, the air space opening through two other edges of the unit, the sealed edges of the unit being provided with support receiving grooves extending from end to end of the unit, and tie means extending transversely through the successive layers of insulating material and said spacer member securing and maintaining the same in assembled relation, the grooved edges of the units being provided with complemental separable fastener members disposed longitudinally thereof so that when two units are mounted in side by side relation with the grooved edges abutting and with said grooves substantially in horizontal alignment, the complemental fastener members of adjacent units may be engaged to separably secure the units together.

RUDOLF F. HLAVATY.

REFERENCES CITED

The following references are of record in the file of this patent:

UNITED STATES PATENTS

| Number | Name | Date |
|---|---|---|
| 543,964 | Michell | Aug. 6, 1895 |
| 1,661,044 | Lawrence | Feb. 28, 1928 |
| 1,749,159 | Respess | Mar. 4, 1930 |
| 1,785,507 | Weiss | Dec. 16, 1930 |
| 1,956,323 | Gregg | Apr. 24, 1934 |
| 1,974,951 | Doorentz | Sept. 25, 1934 |
| 2,045,311 | Roos et al. | June 23, 1936 |
| 2,054,573 | Mendenhall | Sept. 15, 1936 |
| 2,077,713 | Ross et al. | Apr. 20, 1937 |
| 2,110,660 | Doczekal | Mar. 8, 1938 |
| 2,118,949 | Scott | May 31, 1938 |
| 2,147,059 | Randall | Feb. 14, 1939 |
| 2,153,320 | Venzie | Apr. 4, 1939 |
| 2,159,053 | Saborsky | May 23, 1939 |
| 2,160,066 | Frische | May 30, 1939 |
| 2,172,771 | Norris | Sept. 12, 1939 |
| 2,189,067 | Hlavaty | Feb. 6, 1940 |
| 2,240,951 | Hamjy | May 6, 1941 |
| 2,254,856 | Randall | Sept. 2, 1941 |
| 2,263,919 | Darragh, Jr. | Nov. 25, 1941 |
| 2,271,575 | Waterman | Feb. 3, 1942 |
| 2,287,400 | Wells, Jr. | June 23, 1942 |
| 2,326,318 | Anderson | Aug. 10, 1943 |
| 2,365,086 | Kamowski | Dec. 12, 1944 |
| 2,391,515 | Richards | Dec. 25, 1945 |

FOREIGN PATENTS

| Number | Country | Date |
|---|---|---|
| 467,553 | Great Britain | June 18, 1937 |

OTHER REFERENCES

Brindley et al. article from Heating and Ventilating Magazine, July 1941; pages 41–43.